United States Patent [19]

Baba et al.

[11] E Re. 28,867

[45] Reissued June 15, 1976

[54] MOVING OBJECT COMMUNICATION CONTROL SYSTEM

[75] Inventors: Takeshi Baba, Tokyo; Kenji Shibuya, Ohmiya; Tetsuro Maruhama, Amagasaki; Tsuneo Nakahara, Nishinomiya; Kenichi Yoshida, Sakai, all of Japan

[73] Assignee: Sumitomo Electric Industries, Ltd., Osaka, Japan

[22] Filed: Feb. 5, 1973

[21] Appl. No.: 329,650

Related U.S. Patent Documents

Reissue of:

[64] Patent No.: 3,629,707
Issued: Dec. 21, 1971
Appl. No.: 845,167
Filed: July 28, 1969

[30] Foreign Application Priority Data

July 30, 1968 Japan ..... 43-54099

[52] U.S. Cl. ..... 325/51; 246/8; 246/30; 246/167 R; 325/54; 325/55; 340/48; 343/770

[51] Int. Cl. ..... H04b 1/00

[58] Field of Search ..... 246/8, 30, 167 R; 325/51, 52, 54, 55; 340/48; 343/770

[56] References Cited

UNITED STATES PATENTS

| | | | |
|---|---|---|---|
| 2,808,584 | 10/1957 | Kock | 343/768 |
| 2,818,565 | 12/1957 | Ajioka et al. | 343/767 |
| 2,929,065 | 3/1960 | Kreinheder | 343/770 |
| 3,305,682 | 2/1967 | Bolster et al. | 246/167 |
| 3,517,315 | 6/1970 | Malm | 325/54 |

*Primary Examiner*—Albert J. Mayer

[57] ABSTRACT

A communication system between mobile and wayside stations wherein the mobile stations are traveling on a track which is divided into sections by means of an open-type transmission line paralleling the track. A frequency selection and conversion device for each section of transmission line or track is connected to the transmission line to define the length of each section. A series of lower frequency carriers transmitted on the line are allotted respectively to each specific section of transmission line. These low-frequency carriers travel with a low loss along the transmission line and they are selected and converted by their respective frequency selection and converter device to a common high-frequency carrier signal for leaky transmission to a mobile station on the corresponding track section. These signals are used for train control and other communication signals may be transmitted on the same transmission line by a high-frequency carrier signal which is common to all sections, such that the common signal will leak from the transmission line for reception by a mobile station no matter its location on the track.

7 Claims, 6 Drawing Figures

MOVING OBJECT COMMUNICATION CONTROL SYSTEM

Matter enclosed in heavy brackets [ ] appears in the original patent but forms no part of this reissue specification; matter printed in italics indicates the additions made by reissue.

The present invention relates to a moving object communication and control system and particularly to such a system wherein the transmission of carriers for various different types of information between central stations and moving objects or between fixed stations are done by one common open-type transmission line.

In recent times many studies are being made of automatic operation systems for moving bodies, especially railroad trains with a view to their safe operation at high speeds and dense traffic. Such automatic operation systems contemplate a partial or total substitution of train operation now done by humans with an electronic technique which utilizes an electronic computer as its central data processor. In the system referred to above, it is necessary to transmit and process a great variety of information for train operation and passenger service.

The various types of information of such a system may be classified under two major categories: (1), those in which the transmission of information between the central station and each train can be done simultaneously by a common channel, and (2), those in which the transmission of information between the central station and each train must be done by an independent channel. Information for local control, especially the information concerning the location, speed and the like of each individual train comes under category (2), while the information for common train operation control and passenger service such as telephone, television, radio, etc. may be classified under category (1).

What is referred to as the local control above refers to the ability of the control to allow only one train to be present in one section in order to ensure a safe distance between traveling trains, the railroad track being divided into sections of a suitable length.

The present invention provides a moving object communication control system in which the various types of information belonging to the aforementioned categories are transmitted by means of one common open-type transmission line.

In the system of the present invention, the information belonging to category (1) is transmitted on one open-type transmission line by a channel of a common higher carrier frequency, this carrier propagating and partly leaking along the line and being received by all trains. The information belonging to the category (2) is transmitted also on the same line by an independent carrier of a lower carrier frequency which is allotted to a selected section of the track and this carrier is converted at an end of a selected section to a carrier of a higher frequency which is common to all sections over the track, the converted carrier thus propagates and partly leaks along the selected section of the transmission line and is received by a train present in that section conversely individual information from trains present in various sections is radiated by a carrier wave of a higher frequency which is common to all sections over the open-type transmission line, and is coupled by the transmission line, converted to the carriers by lower frequency allotted to the individual section and transmitted to the central station.

The particular feature of the present invention is that the various carriers of lower frequency are transmitted with a low-transmission loss over a long distance of the open-type transmission line and converted to a carrier of a higher frequency which is common to all sections of the transmission line, and a carrier of another higher frequency from the trains which is common to all sections is coupled with the transmission line, and converted to an independent carrier of a lower frequency which is allotted to each section and transmitted in the open-type transmission line to the central station with a low-transmission loss.

In consequence, it is not at all necessary to change the carrier frequency to the particular frequency allotted to each section every time the train travels one section. Therefore a switch over device for the information channel is not necessary in the system. The communication device aboard the train may be a common frequency transmitter and receiver. This makes the system more economical and makes the maintenance of the apparatus easier.

Other features and advantages of the present invention will be clear from consideration of the following detailed description and accompanying drawings.

Figure 1:
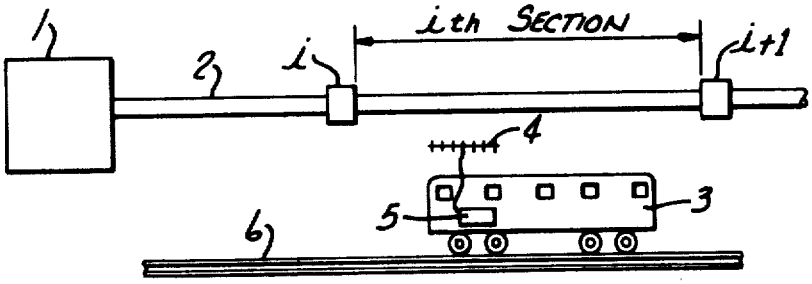
FIG. 1 shows a conceptual diagram of a system according to the present invention.

Referring now to FIG. 1, there is shown a system in accordance with the teachings of the present invention in which 1 denotes a central station including an electronic data processor and communication apparatus, 2 an open-type transmission line installed along the track, 3 a train which is able to couple with the leaked wave from the open-type transmission line 2, 5 an apparatus for communication aboard the train 3, 6 a track for moving objects and i and i+1 frequency selection and conversion devices which are placed at the ends of local sections "i" and "i+1," of the line 2 respectively.

In the moving object communication control system of FIG. 1, the information of the aforementioned category 1 is transmitted from the central station 1 to the line 2 by using a carrier frequency which is common for all sections.

This carrier is transmitted by the line 2 which leaks a portion of it to outer space to be received by the apparatus for communication aboard the train via the antenna 4.

On the other hand, the various types in information of the aforementioned category (2) are transmitted by independent carrier frequencies which are of first lower frequency range which does not leak from the line 2 and are allotted respectively to the sections of the line, each independent carrier being converted at the initial end of a selected section by a frequency selection and conversion device to a common carrier of the first higher frequency which is able to leak partially from the line 2 and be received, if a train is present, by the apparatus for communication aboard the train via the antenna 4.

For example, the independent carrier allotted to section "i" is converted by the frequency selection and conversion device "i" to a common carrier of the first higher frequency to partially leak during the section "i" and couple with the antenna aboard a train.

Conversely, the various types of information from a train present in some section is radiated from antenna 4 of the train by another carrier of the second higher frequency, and coupled with the open-type line 2, transmitted along said section and converted to an independent carrier of a second lower frequency range by a frequency selection and conversion device. This carrier wave does not leak and is transmitted with a low-transmission loss to the central station.

The communication between local stations (not shown) distributed along the line 2 or between local station and central station are performed in the same manner using the same line 2.

Figure 2:
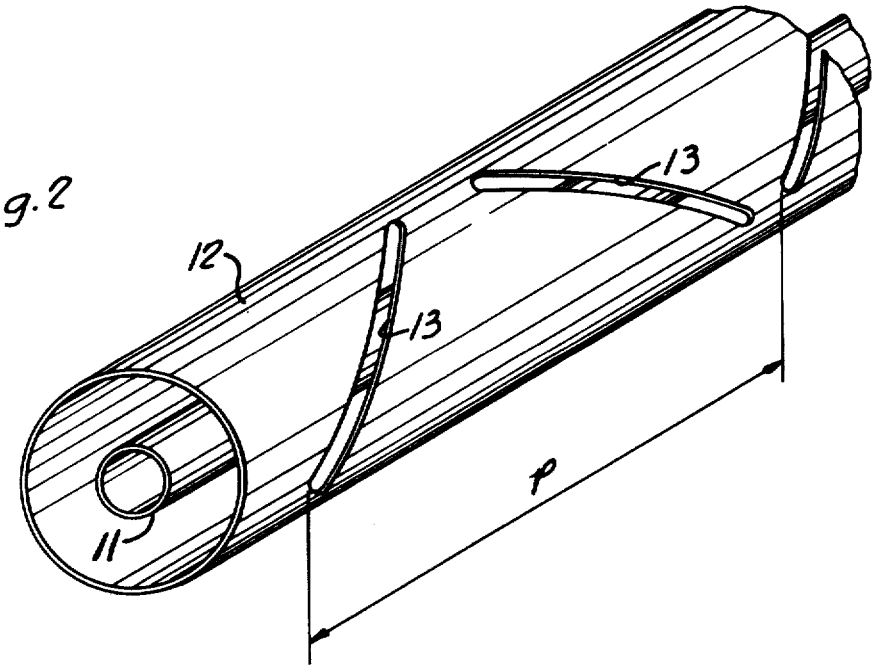
FIG. 2 shows a leaky coaxial cable as an example of the open-type transmission line used for the system of the present invention.

FIG. 2 shows a highly preferable open-type coaxial line as one of the open-type transmission lines of the present invention. In FIG. 2, 11 denotes the inner conductor of a coaxial line, 12 the outer conductor, 13 slits provided recurrently on the outer conductor 12 with a pitch P. When the wavelength λg transmitted in the line as shown in FIG. 2 has the specific relation with the pitch P and with the free space wave length λg that is given by:

$$P > \frac{\lambda g}{1 + \frac{\lambda g}{\lambda o}}$$

the wave having the wavelength λg propagates along the line; leaking out of the slit portions of its energy.

However, when the wavelength λg is under the condition $$\frac{\lambda g}{1 + \frac{\lambda g}{\lambda o}} > P$$

it propagates with a low transmission loss, because no leaky wave occurs along the line under said condition $$\frac{\lambda g}{1 + \frac{\lambda g}{\lambda o}} > P$$

The frequency of the wavelength λg satisfying the condition $$P > \frac{\lambda g}{1 + \frac{\lambda g}{\lambda o}}$$

is essentially higher than that of the wavelength λg satisfying the condition $$\frac{\lambda g}{1 + \frac{\lambda g}{\lambda o}} > P$$

In the present invention a higher frequency which satisfies the condition $$P > \frac{\lambda g}{1 + \frac{\lambda g}{\lambda o}}$$

is used for a carrier frequency common for all sections of the line 2 to be transmitted, partially leaking along the open-type transmission line, and a lower frequency which is under the condition $$\frac{\lambda g}{1 + \frac{\lambda g}{\lambda o}} > P$$

is used for an independent carrier frequency to be transmitted with a low loss along the line.

Figure 3:
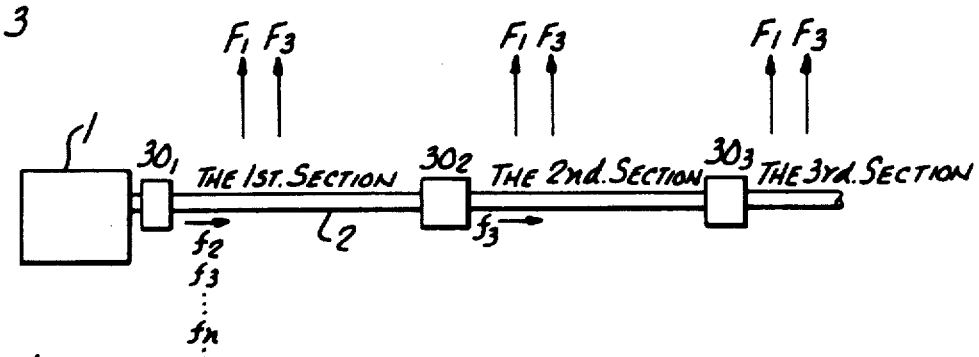
FIG. 3, FIG. 5 and FIG. 6 are schematic diagrams explaining the operation of the system of FIG. 1.

Referring to FIG. 3, the operation of the system of FIG. 1 will be explained in further detail. The independent signals $S_1$, $S_2$, $S_3$ . . . belong to the category (2) for the first, second, third . . . sections respectively and are carried by independent carrier frequencies $f_1$, $f_2$, $f_3$ . . . of the first low-carrier frequency respectively.

When these signals are sent on the transmission line 2, the frequency selection and conversion device 30, provided at the initial end of the first section (not necessarily at the initial terminal) extracts the signal $S_1$ of the frequency $f_1$ and converts it to the carrier of the first higher frequency $F_1$ for coupling with the train antenna.

It is thus transmitted along the transmission line of the first section and information $S_1$ is sent to the train located in the first section. In the first section, $S_2$, $S_3$ . . . are transmitted with a frequencies $f_2$, $f_3$ . . . unchanged, while the frequency $F_1$ which carries $S_1$ is present only in the first section.

The frequency selection and conversion device ($30_2$) provided at the initial end of the second section, (not necessarily at the initial end) extracts the signal $S_2$ of the carrier of the first lower frequency $f_2$ and this is converted to the carrier of the first higher frequency $F_1$, the same as that for the preceding section, for coupling with the train antenna. The signal $S_2$ is thus transmitted to the train antenna, of a train traveling in the second section. The frequency $F_1$ which carries $S_2$ is present only in the second section. Likewise, $S_n$ is transmitted in the nth section. $F_3$ is another higher carrier frequency for the common information for all sections.

Figure 4:
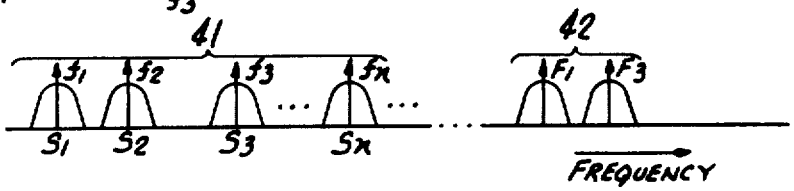
FIG. 4 is a diagram of the frequency spectrum of the carrier frequencies for the various types of information of the system of FIG. 1.

FIG. 4 is a frequency spectrum which is sent from the central station 1 to the transmission line 2 of the system of FIG. 3.

In FIG. 4, 41 denotes a group of carriers of the first lower frequency $f_1$, $f_2$, $f_3$ . . . $f_n$ conveying the independent signals $S_1$, $S_2$, $S_3$ . . . $S_n$ respectively, 42 a group of carriers of high frequency $F_1$, $F_3$ which are common to all sections of the line 2, $F_1$ of some section being of the frequency conversion of the carrier of the first lower frequency allotted to that section.

Figure 5:
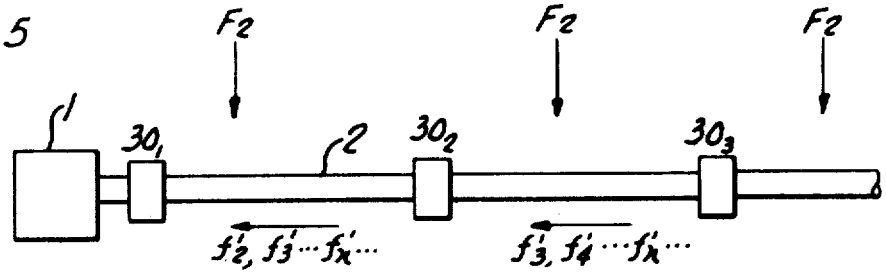

On the other hand, the transmission of signals from trains to the central station are also carried out in a similar way. This will be explained with reference to FIG. 5.

A signal is transmitted by the antenna of a train in the nth section by the carrier of the second high frequency $F_2$ which is common to all sections, this signal of the frequency $F_2$ coupling with the transmission line 2 and is converted to a low carrier of the second low frequency $f'_n$, by the frequency selection and converter 30n at the terminal end (not necessarily at the terminal end) of the nth section and is transmitted to the central station 1 with a low loss.

Likewise, the signal from the train in other sections are radiated by the second high frequency $F_2$ and by the train antenna, coupled by the transmission line, converted to the respective frequency $f'_2, f'_3, \ldots f'_n$ 1 for that section and sent to the central station.

The frequency selection and conversion devices 30 may be readily constructed by those of ordinary skill in the art by conventional components assembled in such a manner to accomplish the frequency conversion and selection functions required. For example, it may be composed of the following well-known devices in combination: (a) a branching filter for selecting a designated frequency component $f_n$ from a number intermediate frequency signals $f_1, f_2 \ldots f_n$ which propagate in the single open-type transmission line, (b) a demodulator for demodulating said selected intermediate frequency signal to a base band carried signal, (c) a modulator for modulating a high-frequency current $F_1$ supplied by a generator by said base band signal, and (d) a diplexer for sending out from an output terminal of said diplexer the addition of signals coming from two different input terminals of said diplexer.

Device 30 thus has the function of selecting a designated signal from a number of intermediate frequency signals and converting said intermediate carrier frequency signal to a very high-carrier frequency signal, carrying the same modulation information as carried by the intermediate carrier frequency.

As has been explained, the system of the present invention makes it possible to transmit information independently between each individual section and the central station without changing the frequency for each traveling train as it travels on.

For the transmission of information common to all the sections which belongs to the category (1), the transmission is made from the central station at a frequency $F'_3$ of the frequency range, for leaky wave coupling with train antennas and, where necessary, there are installed at suitable intervals repeater devices for the amplification of the signal of frequency $F'_3$.

Figure 6:
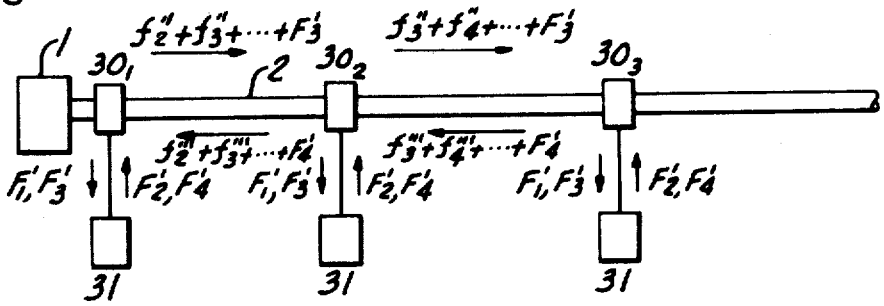

What has been stated refers to communication between a ground station and traveling trains. However, communication can likewise be carried out between a ground station and another ground station. This will be explained with reference to FIG. 6 wherein, 1 denotes the central station, 2 open-type transmission line, $\mathbf{30_1}$, $\mathbf{30_2}$, $\mathbf{30_3}$ . . . frequency selection and conversion devices, 31 ground station, $f''_2, f''_3 \ldots$ carrier frequencies for the transmission of separate information from ground station to the central station respectively. $F'_1$ is a carrier frequency common to all ground stations which is converted from any one of the separate informations allotted to each ground station by means of a frequency selection and conversion device and received by a ground station. $F'_2$ is another carrier frequency common to all ground stations which is sent out of a ground station, coupled by the transmission line and converted to each independent carrier frequency allotted to a ground station by means of a frequency selection and conversion device.

$F'_2$ converted by the frequency selection and conversion devices to individual lower frequencies called the second lower frequencies ($f'''_1, f'''_2, f'''_3 \ldots$) for communication between each ground station and the central station. Independent transmission of information between the central station and each ground station is carried out in this way. Thus the frequency employed by all the ground stations is made one and the same, so that the standardization of stations is made possible. It may be said that this is accompanied also by the advantage that a portable telephone carried by construction and maintenance workers for job communication and protection against danger can easily be accommodated by a plug-in-type assembly.

A leaky coaxial line is one of the suitable transmission lines for signal transmission employed in the system of the present invention. However, any transmission line having a requisite transmission capacity such as a stripline having a periodic structure will be found to be equivalently good.

We claim:

1. A communication system between mobile and a wayside stations, said mobile stations traveling on a track divided in sections by means of an open-type transmission line paralleling the track, a frequency selection and conversion device for each section along said open-type transmission line and connected thereto at the proper position to define the length of each section, means to transmit a series of first lower frequency carriers on said open-type transmission line at a low loss from said wayside station, said carriers allotted respectively to each specific section of said open-type transmission line, said selection and conversion devices operable to select and convert their respective first lower frequency carrier to a first higher frequency carrier for leaky transmission from said transmission line to a mobile station on the corresponding track section, an antenna for each mobile station for receiving and transmitting signals to said open-type transmission line.

2. The communication system of claim 1 wherein the frequency of said first higher frequency carrier is common to all sections of said open-type transmission line.

[ 3. The communication system of claim 1 characterized by means to transmit at least one high-frequency carrier which is common to all of said sections from said wayside station or said mobile stations on said open-type transmission line.]

4. The communication system of claim [ 3 ] *1* characterized in that selected of said mobile stations are *substituted by* stationary ground stations coupled through their corresponding of said frequency selection and conversion devices directly to said transmission line.

5. The communication system of claim 1 [ characterized by means on selected of said ] *wherein a* mobile [ stations to transmit ] *station traveling along a track section transmits* at least one second higher frequency carrier [ common to all of said sections ] from its [ respective ] antenna to said transmission line [ , ] *and* said conversion device for the corresponding track section of said open-type transmission line [ being ] *is* operable to convert said carrier of second higher frequency to [ a ] *the* second lower frequency *allotted to said corresponding section on which said mobile station travels* for transmission along said line at a low loss to said wayside station.

6. The communication system of claim [ 1 ] *5* characterized in that selected of said mobile stations are *substituted by* stationary ground stations coupled through their corresponding of said frequency selection and conversion devices directly to said transmission line.

7. The communication system of claim 1 wherein said open-type transmission line is an open-type coaxial transmission line.

8. The communication system of claim 7 wherein said coaxial line has an outer conductor sheath with a longitudinal series of alternately slanted slots having a spacing pitch P, said lower frequency [ carries ] *carriers* all having a frequency regulated by the condition $$\left[\frac{\lambda g}{1+\frac{\lambda g}{\lambda o}} > P\right] \quad \frac{\lambda g}{1+\frac{\lambda g}{\lambda o}} > P$$

and said higher frequency carriers all having a frequency regulated by the condition $$P > \frac{\lambda g}{1+\frac{\lambda g}{\lambda o}}.$$

* * * * *

UNITED STATES PATENT OFFICE
CERTIFICATE OF CORRECTION

PATENT NO. : Re 28,867

DATED : June 15, 1976

INVENTOR(S) : Takeshi Baba, Kenji Shibuya, Tetsuro Maruhama, Tsuneo Nakahara and Kenichi Yoshida It is certified that error appears in the above-identified patent and that said Letters Patent are hereby corrected as shown below:

Entry [73] correct identification of Assignee to read

Assignees Japanese National Railways; Mitsubishi Electric Corp. Tokyo; Sumitomo Electric Industries, Ltd., Osaka, Japan.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*